(12) United States Patent
Kluftinger et al.

(10) Patent No.: US 11,560,142 B2
(45) Date of Patent: Jan. 24, 2023

(54) SPEED SENSOR INCLUDING INSULATING INNER AND OUTER RECESSES

(71) Applicant: KNORR-BREMSE SYSTEME FUER NUTZFAHRZEUGE GMBH, Munich (DE)

(72) Inventors: Andre Kluftinger, Kleinheubach (DE); Klaus Lechner, Pretzfeld (DE); Michael Blessing, Munich (DE); Guenter Klein, Unterensingen (DE)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 186 days.

(21) Appl. No.: 16/960,560

(22) PCT Filed: Jan. 8, 2019

(86) PCT No.: PCT/EP2019/050285
§ 371 (c)(1),
(2) Date: Jul. 8, 2020

(87) PCT Pub. No.: WO2019/137888
PCT Pub. Date: Jul. 18, 2019

(65) Prior Publication Data
US 2020/0339105 A1   Oct. 29, 2020

(30) Foreign Application Priority Data
Jan. 12, 2018   (DE) ............ 10 2018 000 221.8

(51) Int. Cl.
*B60W 30/02* (2012.01)
*B60W 30/14* (2006.01)
(Continued)

(52) U.S. Cl.
CPC ............ *B60W 30/02* (2013.01); *B60W 30/14* (2013.01); *B60W 40/107* (2013.01); *G01P 1/026* (2013.01); *G01P 3/487* (2013.01); *B60W 2520/28* (2013.01)

(58) Field of Classification Search
CPC .... B60W 30/02; B60W 30/14; B60W 40/107; B60W 2520/28; G01P 1/026; G01P 3/487; B60T 8/171
(Continued)

(56) References Cited

U.S. PATENT DOCUMENTS 5,351,388 A   10/1994   Van Den Berg et al.
5,670,873 A *  9/1997   Onishi .................... G01P 3/488
                                                     73/514.39
(Continued)

FOREIGN PATENT DOCUMENTS

DE        4331969 A1    3/1995
DE        19580281 T1 *  5/1996
(Continued)

OTHER PUBLICATIONS

Translation of DE-19580281-T1, Davidson et al (Year: 1996).*
International Search Report dated Mar. 29, 2019 of the corresponding International Application PCT/EP2018/050285.

*Primary Examiner* — Nathaniel T Woodward
(74) *Attorney, Agent, or Firm* — Norton Rose Fulbright US LLP; Gerard Messina; Aaron Deditch (57) ABSTRACT

A speed sensor for measuring a speed of an object moving relative to the speed sensor, including: a speed sensor housing for providing sliding and/or frictional and/or positively locking insertion into a fixed receptacle, wherein the speed sensor housing houses an injection molded part which is made of plastic and into which at least part of a speed sensor element is injected; wherein the injection molded part has at least one outer recess, on its outer circumferential (Continued)

surface facing an inner face of a wall of the speed sensor housing, wherein an empty outer chamber is formed between each boundary surface of an outer recess and the inner face of the wall of the speed sensor housing, and/or wherein at least one inner recess, which forms an empty inner chamber, is formed inside the injection molded part. Also described are a related driver assistance system and a motor vehicle.

18 Claims, 4 Drawing Sheets

(51) Int. Cl.
  *B60W 40/107* (2012.01)
  *G01P 1/02* (2006.01)
  *G01P 3/487* (2006.01)
(58) Field of Classification Search
  USPC .......................................................... 73/488
  See application file for complete search history.

(56) References Cited

U.S. PATENT DOCUMENTS

| | | | |
|---|---|---|---|
| 6,288,532 | B1 | 9/2001 | Steinauer et al. |
| 9,429,587 | B2 | 8/2016 | Steinich |
| 9,752,622 | B2 * | 9/2017 | Takanashi ............. F16C 41/007 |
| 10,245,884 | B2 * | 4/2019 | Fukuda ............... B29C 45/0025 |
| 2004/0119464 | A1 | 6/2004 | Taneyhill |
| 2004/0126562 | A1 * | 7/2004 | Manzo ................... F16L 59/021 428/313.5 |
| 2009/0125181 | A1 * | 5/2009 | Luke .................... B60C 23/062 180/204 |
| 2012/0001623 | A1 * | 1/2012 | Steinich ............... G01D 11/245 324/207.25 |
| 2012/0189234 | A1 * | 7/2012 | Torii ...................... G01P 3/443 384/448 |
| 2018/0010933 | A1 | 1/2018 | Ikeda |

FOREIGN PATENT DOCUMENTS

| | | | | |
|---|---|---|---|---|
| DE | 19580281 | T1 | 5/1996 | |
| DE | 19744673 | A1 | 5/1999 | |
| DE | 102004016430 | B3 | 9/2005 | |
| DE | 202010009785 | U1 | 10/2010 | |
| GB | 2361284 | A * | 10/2001 | ............ F16L 59/075 |
| GB | 2361284 | A | 10/2001 | |
| JP | 200365835 | A | 3/2003 | |

* cited by examiner

FIG.3

SPEED SENSOR INCLUDING INSULATING INNER AND OUTER RECESSES

FIELD OF THE INVENTION

The present invention relates to a speed sensor for measuring a speed of an object moving relative to the speed sensor, having a speed sensor housing which is provided for frictional and/or positively engaging insertion into a fixed receptacle, wherein the speed sensor housing houses an injection molded part which is made of plastic and into which at least part of a speed sensor element is injected.

The present invention also relates to a driver assistance system, in particular to an anti-slip brake control system (ABS), to a traction control system (TCS), to a vehicle movement dynamics control system (ESP), to an adaptive cruise control system (ACC) or to an adaptive vehicle control system, which system contains at least one speed sensor.

Finally, the present invention also relates to a motor vehicle having a driver assistance system.

BACKGROUND INFORMATION

Such speed sensors are provided for measuring the speed or rotational speed of moving machine parts, such as e.g. gearwheels, and feeding a corresponding signal to electronics for further processing via a connected electrical lead. Such a speed sensor can be represented, for example, by a wheel speed sensor which senses the rotational speed of a vehicle wheel of a motor vehicle within the scope of an anti-slip brake control operation.

Passive speed sensors and active speed sensors are believed to be understood. Active speed sensors are measuring pickups which contain internally amplifying or signal-shaping components and are operated with a power supply. The sensor signal can output a square-wave signal directly by its electronics which are integrated in the sensor. Passive speed sensors are, in contrast, sensors which contain only passive elements (such as an induction coil with inductance, capacitance and resistance). The signals are in most cases output as an analogue voltage and usually follow a sinusoidal voltage whose frequency changes in accordance with the rotational speed.

Rotational speed sensors in the case of an anti-slip brake control operation can accordingly be "passive" or "active". Rotational speed sensors without a permanently applied power supply ("passive" induction coil) are therefore referred to as "passive". Rotational speed sensors whose "active" electronic component is continuously applied to the power supply with e.g. the effective principle of the "Hall effect" are referred to as "active".

A speed sensor of the generic type is discussed in DE 43 31 969 C2.

In this context, when such speed sensors are used it may be found that a relatively large amount of thermal energy is transmitted to the speed sensor from the surroundings (e.g. in the case of installation near to a brake disk) or from the moving object, which is disadvantageous in particular in the case of the above-described active speed sensors in which the sensor element comprises integrated evaluation electronics. As a result of overheating, such speed sensors can cause incorrect measurements or can fail.

SUMMARY OF THE INVENTION

The present invention is accordingly based on the object of further developing a speed sensor of the type described above in such a way that it has a higher level of functional reliability. Furthermore, the intention is to also make available a vehicle assistance system with at least one such speed sensor and also to make available a vehicle with such a vehicle assistance system.

This object may be achieved by the features as described herein.

The present invention is based on a speed sensor for measuring a speed of an object moving relative to the speed sensor, having a speed sensor housing which is provided for frictional and/or positively locking insertion into a fixed receptacle, wherein the speed sensor housing houses an injection molded part which is made of plastic and into which at least part of a speed sensor element is injected.

Therefore, the at least one part of the speed sensor element during the original molding of the injection molded part which is made of plastic is injected into the injection molded part in one operation. In this context, electric cables can project out of the injection molded part, which cables are electrically connected to the at least one part of the speed sensor element, in order to pass on the speed signals, detected by the speed sensor element, for example to electronics for further processing.

The speed sensor element can be a passive or active speed sensor element as described above.

According to the invention there is provision that a) the injection molded part has at least one outer recess, on its outer circumferential surface facing an inner face of a wall of the speed sensor housing, wherein an empty outer chamber is formed between each boundary surface of an outer recess and the inner face of the wall of the speed sensor housing, and/or in that b) at least one inner recess, which forms an empty inner chamber, is formed inside the injection molded part.

In particular, a plurality of outer recesses which are spaced apart from one another and separated from one another are present in or on the outer circumferential surface of the injection molded part and/or a plurality of inner recesses which are spaced apart from one another and are separated from one another are present inside the injection molded part.

The term boundary surface of an outer recess is to be understood as meaning the surface of the outer recess which faces the empty outer chamber and comprises, for example, a base area of the outer recess. In particular, with the exception of the at least one empty outer recess, the outer circumferential surface of the injection molded part is of a smooth configuration and, for example, cylindrical.

An empty inner or outer chamber serves then, in particular, not to receive further components such as, for example, a sealing ring, but rather forms an insulating chamber.

Such an empty inner or outer chamber prevents, in a way similar to a Dewar flask, the three possible heat transfer processes of thermal conduction, thermal radiation and convection. The thermal conduction is influenced both by the air and the vacuum in the empty inner or outer chamber because air or a vacuum has low thermal conductivity. Likewise, air or a vacuum in the empty inner or outer chamber reduces the transport of heat through radiation. An evacuation of an empty inner or outer chamber prevents the transport of heat by convection.

In this context, of course, a plurality of such empty inner or outer recesses or inner or outer chambers can be formed on the outer circumferential surface of the injection molded part or inside the injection molded part, which advantageously impedes the transfer of heat from the wall of the speed sensor housing, which can heat up through (direct)

contact with the receptacle of the speed sensor, and the injection molded part or advantageously impedes the conduction of heat inside the injection molded part. As a result, the thermal load acting on the injection molded part and therefore on the at least one part of the speed sensor element decreases, which increases the functional reliability of said sensor element. Furthermore, empty chambers which are formed inside the injection molded part restrict the conduction of heat inside the injection molded part and therefore into the at least one part of the speed sensor which is injected there.

Advantageous developments and improvements of the first aspect of the invention are possible by virtue of the measures specified in the dependent claims.

According to one embodiment, at least one empty inner or outer chamber is evacuated or partially evacuated. As already explained above, this gives rise to a further reduction in the heat transfer processes between the wall of the speed sensor housing and the injection molded part or inside the injection molded part.

In particular, the speed sensor housing can be at least partially embodied in the form of a cylindrical sleeve, and the injection molded part can be embodied at least partially as a cylindrical solid body, in particular in an overlapping area in which the at least one empty chamber is formed.

The inner or outer recess can penetrate the injection molded part only partially, but not completely. However, it is also alternatively conceivable for the injection molded part to be penetrated completely by the at least one inner or outer recess.

The speed sensor housing particularly may be embodied as a clamping sleeve. This means, for example, that the speed sensor housing has outwardly elastically protruding portions which deform when they are inserted into the receptacle and as a result bring about frictional engagement between an inner surface of the receptacle, for example a drilled hole, and an outer surface of the protruding elastic portion of the speed sensor housing. The speed sensor can then be held in the receptacle through this frictional engagement alone, and together with optional additional positively locking engagement.

In particular, the speed sensor housing can be fabricated from sheet steel.

At least one sealing element, which seals the at least one outer chamber with respect to the surroundings, can particularly be arranged between the speed sensor housing and the injection molded part. Consequently, the at least one sealing element prevents the at least one empty and, for example, evacuated, outer chamber from filling with air from the surroundings.

According to one development, the speed sensor can be a rotational speed sensor and the moving object can be a rotating object, wherein the rotating object drives, for example, a rotor with permanent magnets or ferromagnetic teeth which are arranged on a circumference of the rotor in such a way that their poles or tooth and gap alternate.

The rotor with the permanent magnets then forms, in particular, a component of the speed sensor because the measuring principle of the speed sensor is then based on the fact that a rotation of the rotor generates a pulse-shaped change in the magnetic field, which change gives rise to an alternating voltage signal at an output terminal of the static part of the speed sensor, which part comprises, for example as a speed sensor element in this case, a Hall element and a semiconductor chip for sensing changes in the magnetic field. In addition, the signal is amplified by the semiconductor chip and conditioned for the corresponding interface. This can be, for example, a current interface with a log.

In particular, the speed sensor housing can be embodied in the form of a cup and can have a speed sensor housing base at its end pointing toward the rotating object. Furthermore, a front-side outer recess, in the base surface of which at least part of the speed sensor element is arranged, can be formed on an end-side front area, facing the rotating object, of the circumferential surface of the injection molded part, wherein a front-side empty outer chamber is formed between the base surface of the front-side outer recess and the speed sensor housing base. The at least one part of the speed sensor element is then thermally insulated particularly effectively with respect to the rotating part by this front-side empty outer chamber.

However, the greater the extent to which the speed sensor element is removed from its rotating object, the lower the signal which can be sensed by it. This technical contradiction is solved advantageously by providing ferromagnetically conductive coupling element. The coupling element which is made of ferromagnetic material extends, for example, axially from the speed sensor element into the front-side outer recess of the injection molded part.

In one advantageous embodiment, this coupling element can be equipped with cooling fins which reduce the flow of heat to the speed sensor element. The coupling element can have, as a further advantageous property, a taper at at least one end, which taper serves to concentrate the electrical field in the speed sensor element.

However, the speed sensor element is not limited to a Hall element which is mentioned only by way of example here. In particular, any active or passive speed sensor elements are conceivable whose measuring principle is based on the magnetoresistive effect and in which a change of the electrical resistance of a material occurs by applying an external magnetic field (MR sensors).

The invention also relates to a driver assistance system of a motor vehicle, for example to an anti-slip brake control system (ABS), to a traction control system (TCS), to a vehicle movement dynamics control system (ESP), to an adaptive cruise control system (ACC) or to an adaptive vehicle control system for at least partially autonomous driving which system is provided with a speed sensor as described above, and also to a motor vehicle having such a driver assistance system.

An exemplary embodiment of the invention is illustrated in the drawing below and explained in more detail in the following description.

DETAILED DESCRIPTION

Figure 1A:
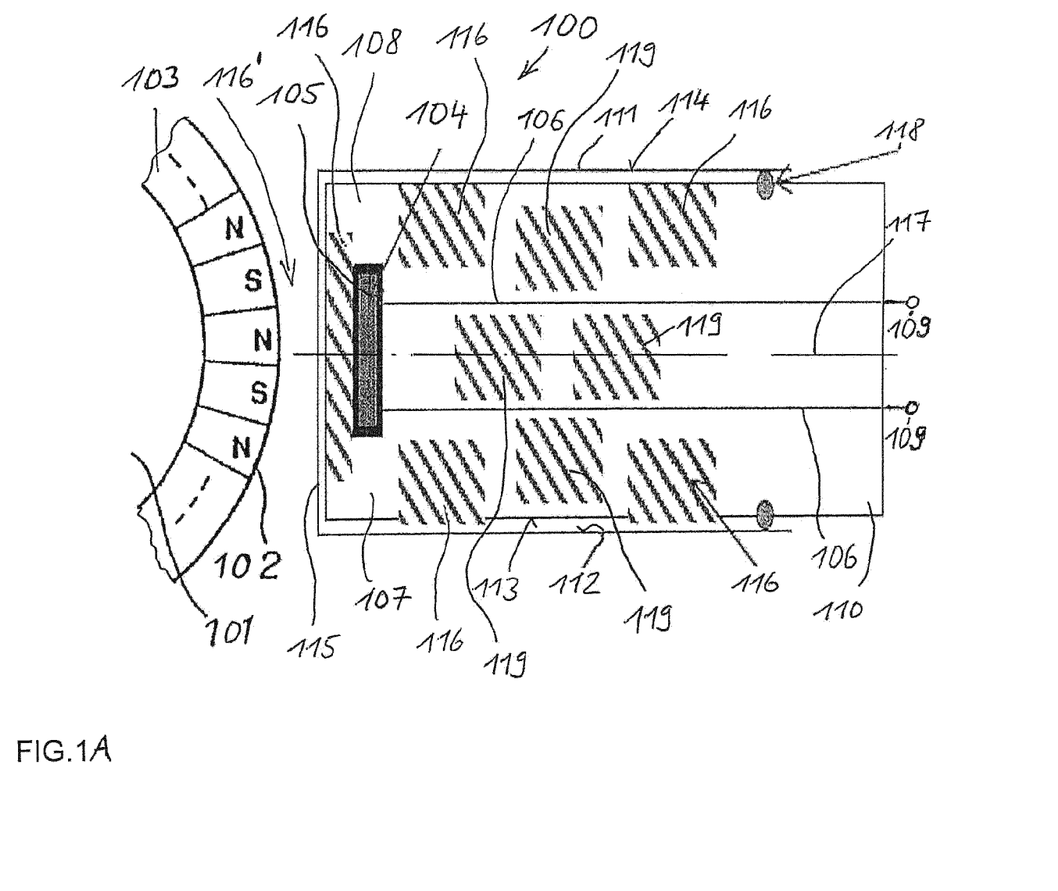
FIG. 1A shows a cross-sectional view through an exemplary embodiment of a speed sensor according to the invention.

FIG. 1A illustrates an exemplary embodiment of a speed sensor 100, embodied here, for example, as a wheel speed sensor, for measuring the wheel speed of a wheel of a motor vehicle. The speed sensor 100 is used here, for example, in an anti-lock brake system (ABS).

The speed sensor 100 comprises a Hall IC 104, which interacts with a rotor 101 of the speed sensor 100 which is mounted on the wheel of the motor vehicle, in order to rotate synchronously therewith. The rotor 101 has a ring 103 with a multiplicity of permanent magnets 102 which are arranged on the circumference of the rotor 101 in such a way that their poles alternate, so that they generate a pulse-shaped change in the magnetic flux during the rotation of the rotor 101. The fixed Hall IC 104 comprises a Hall element 105 as well as further components (not shown explicitly here). The Hall element 105 is therefore coupled magnetically into a magnetic circuit of the permanent magnets 102. The Hall element 105 is supplied with voltage by a voltage lead (not shown here) and earthed via a ground lead (likewise not shown here). The Hall element 105 and the Hall IC 104 form here, for example, one structural unit, wherein the Hall element 105 points toward the rotor 101.

As a result of the changes in the magnetic flux which are generated by the rotation of the rotor 101, the Hall element 105 generates an alternating voltage signal at its output terminal which is connected here to evaluation electronics of the Hall IC 104, which electronics then input output signals into a signal cable, in which signals the wave form of the alternating voltage signal applied thereto is converted into a standardized signal form. The measuring principle of such a Hall IC 104 is adequately known and will therefore not be explained further here. The Hall IC 104 and the Hall element 105 form here, for example, one structural unit and, together with the signal cable 106, are completely injection-molded into an injection molded part 107, which forms here, for example, a cylindrical solid body. In this context, the structural unit composed of the Hall element 105 and the Hall IC 104 is arranged, in particular, in the end 108, facing the rotor 101, of the injection molded part 107, while terminals 109 of the signal cable 106 project out of the other end 110 of the injection molded part 107, to which terminals 109 a cable is then connected and applies wheel rotational signals into external ABS control electronics (not illustrated here) for further processing. The injection molded part 107 can be manufactured by injection molding from any desired plastic material which is suitable for injection.

The injection molded part 107 which is made of plastic is arranged or housed here, for example, partially inside a speed sensor housing 111, wherein, here, for example, only the end 110 of the injection molded part 107 which faces away from the rotor 101 still projects out of the speed sensor housing 111.

The speed sensor housing 111 is embodied here, for example, in the form of a cup and cylindrically and has been produced, for example, by deep-drawing a piece of sheet steel. The external diameter of the injection molded part 107 is here, for example, slightly smaller than an internal diameter of a radially inner circumferential surface 112 of the wall of the speed sensor housing 111, so that the radially inner circumferential surface 112 of the wall of the speed sensor housing 111 is essentially in contact with a radially outer circumferential surface 113 of the injection molded part.

The speed sensor 100 is then inserted with the radially outer circumferential surface 114 of its speed sensor housing 111 into a cylindrical drilled hole (not shown here) of a fixed receptacle in a displaceable manner, e.g. with a clamping sleeve, which is connected to a chassis of the motor vehicle on which the respective wheel is rotatably mounted.

The end 108, lying opposite the rotor 101, of the injection molded part 107 in which the Hall IC 104 and the Hall element 105 are integrated is then bordered or surrounded by a speed sensor housing base 115 of the cup-shaped speed sensor housing 111. A clear or effective air gap 116' is then formed between the speed sensor housing base 115 and the rotor 101.

The injection molded part 107 has here, for example, a plurality of radially outer recesses 116 which are spaced apart from one another, on its radially outer circumferential surface 113 which faces the radially inner circumferential surface 112 of the wall of the speed sensor housing 111, wherein an empty chamber is formed between each boundary surface of each of these outer recesses 116 and the radially inner circumferential surface 112 of the wall of the speed sensor housing 111. The term "empty chamber" means that there is no further component, such as for example a seal, arranged there. An "empty chamber" can, however, be filled with air at ambient pressure, evacuated or even partially evacuated.

In particular, on a front area, facing the rotor 101, of the circumferential surface of the injection molded part 107, a front-side outer recess 116, here, for example, a disk-shaped one which is coaxial to a central axis 117 of the speed sensor 100 is formed, in the base of which recess 116 the Hall element 105 is arranged in such a way that a sensor face of the Hall element 105 points or projects into the front-side recess.

Furthermore, a front-side empty outer chamber can be formed between the base surface of the front-side outer recess 116 of the injection molded part 107 and the speed sensor housing base 115. The Hall element 105 and the Hall IC 104 are then thermally insulated particularly effectively with respect to the rotor 101 by this front-side empty outer chamber.

Furthermore, a sealing element 118, which is formed here, for example, as a circumferential sealing ring, is arranged between the radially inner circumferential surface 112 of the wall of the speed sensor housing 111 and the radially outer circumferential surface 114 of the injection molded part 107, so that the empty outer chambers 116 are sealed with respect to the surroundings.

In addition to the empty outer recesses 116 or instead of them, inner empty recesses 119 can be formed in the interior of the injection molded part 107 and then form inner empty chambers. These inner empty recesses 119 are then also separated or spaced apart from one another.

Figure 1B:
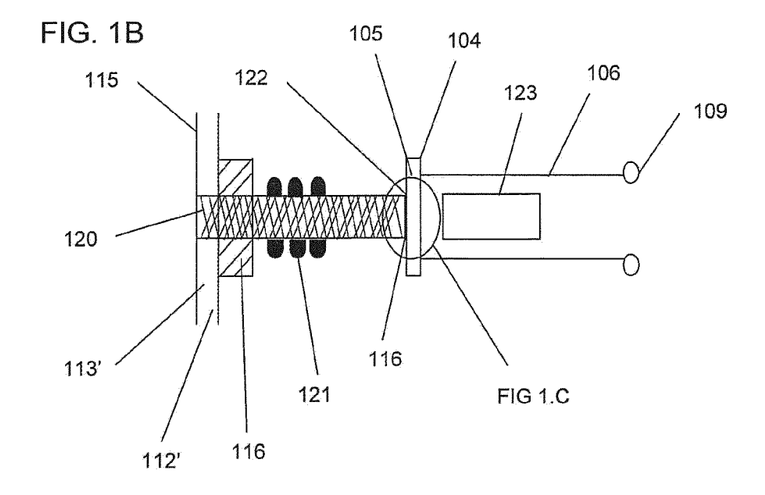
FIG. 1B shows a cross-sectional view through an exemplary embodiment of a speed sensor according to the invention with a coupling element for conducting the magnetic flux.

FIG. 1B shows a further embodiment which compensates for the disadvantages which result from the front-side empty outer chamber which is also formed here between the front-side outer recess 116 of the injection molded part 107 and the speed sensor housing base 115, because this empty outer chamber causes the effective air gap 116' to be enlarged, and could therefore weaken the signal in the Hall element 105 of the Hall IC 104. In order to compensate the weakening of the signal, a coupling element 120 which is composed of ferromagnetic material is provided here, said coupling element 120 extending here axially, for example, from the Hall element IC 104 into the front-side outer recess 116 of the injection molded part 107. Owing to its ferromagnetic material, this coupling element amplifies the magnetic flux and therefore also the signal of the Hall IC 104.

Figure 1C:
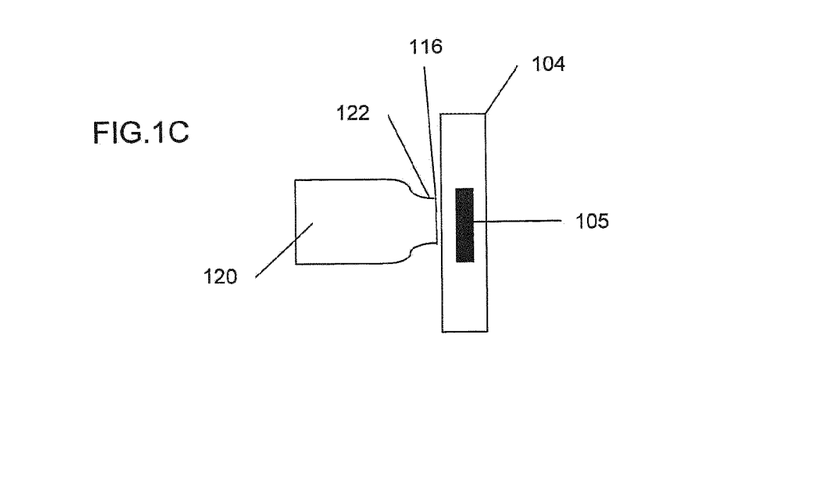
FIG. 1C shows a cross-sectional view through an exemplary embodiment of the coupling element for conducting the magnetic flux from FIG. 1b.

The coupling element 120 can have additionally with cooling fins 121 and for focusing the magnetic field, a taper 122 at at least one end, as is shown in FIG. 1C. For use on ferromagnetic pole wheels, a magnet 123 can be added for biasing the Hall element 105. Furthermore, in FIG. 1B, an inner circumferential surface of the sensor tip is denoted by 112' and an outer circumferential surface of the sensor tip by 113'.

FIG. 1C illustrates, in an enlarged illustration, the junction of the coupling element 120 with its tapered end 122 for focusing the magnetic flux in the Hall element 105 of the Hall IC 104, as well as the optional thermal decoupling 116.

Figure 2:
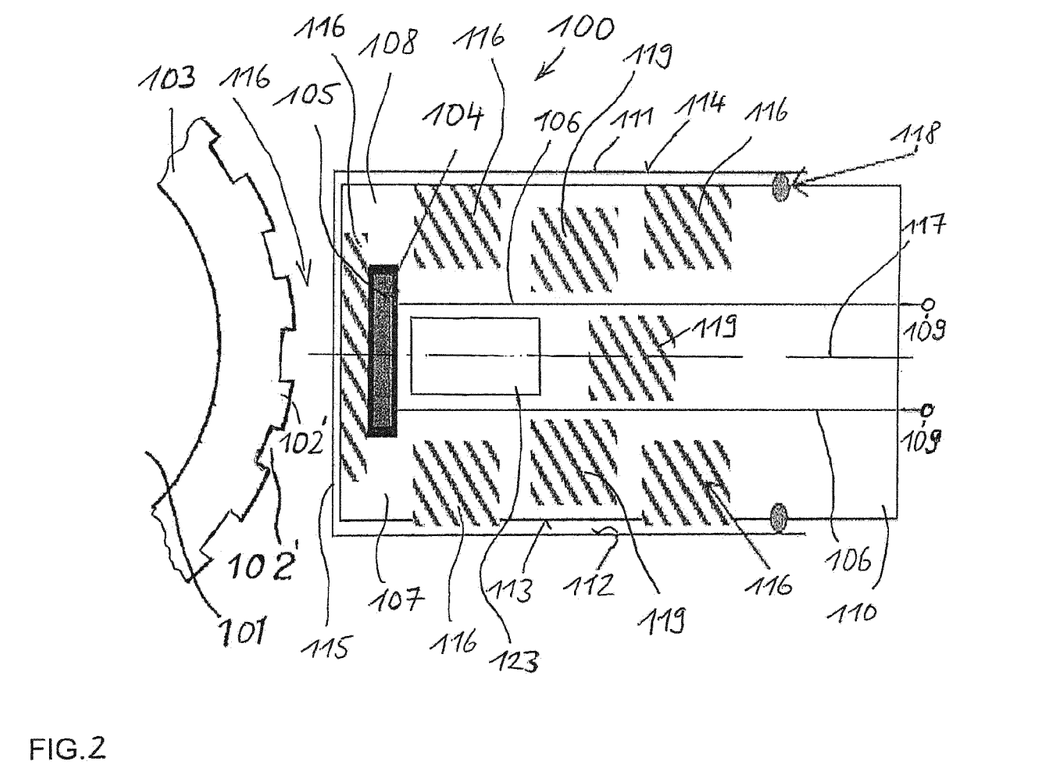
FIG. 2 shows a cross-sectional view through a further embodiment of a speed sensor according to the invention.

FIG. 2 shows a further embodiment of a speed sensor 100 which is also embodied here, for example, as a wheel rotational speed sensor and in which a rotor 101 which is encoded ferromagnetically with teeth and gaps 102' is present instead of a magnetically encoded rotor 101 or ring 103, as in FIG. 1A. For example, an additional permanent magnet 123 is used to magnetically bias the Hall element 105.

Figure 3:
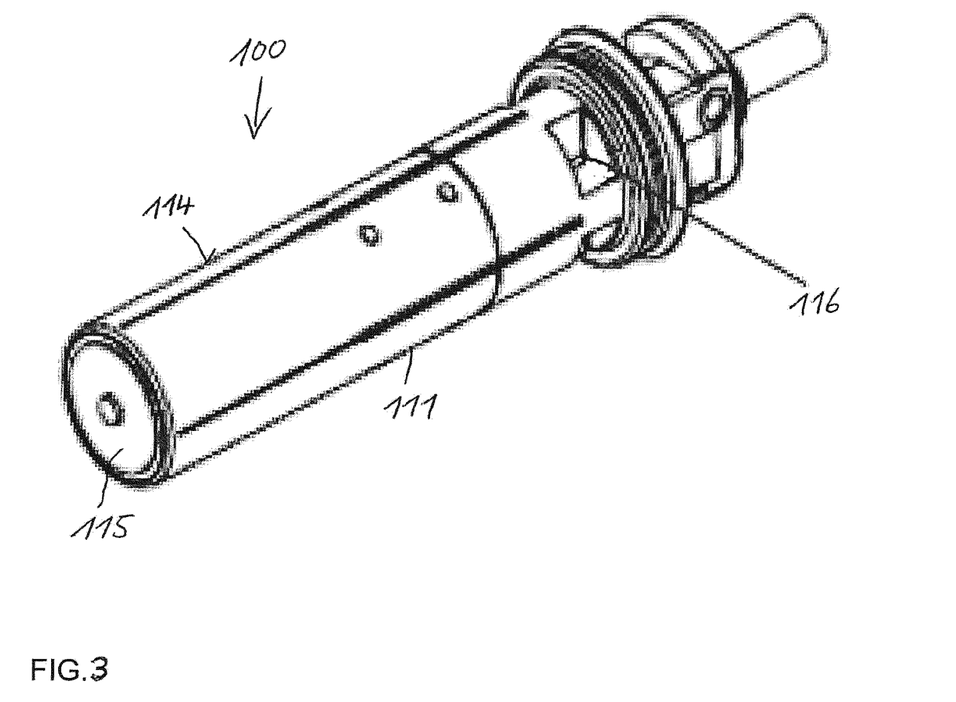
FIG. 3 shows a perspective partially broken-away view of the speed sensor from FIG. 1.

FIG. 3 shows, in a broken-away illustration of the speed sensor 100 in which the speed sensor housing 111 has been moved in certain places, an example of an outer recess 116 which may only partially penetrate the injection molded part 107 and therefore also has a base surface, similar to a blind hole, as a boundary surface.

The empty inner and outer chambers which are formed in this way then serve, in particular, not to receive further components such as, for example, sealing rings, but rather each form empty insulating chambers. In particular, the empty inner and outer chambers are evacuated, and the outer chambers are then, in particular, sealed with respect to the surroundings by the sealing ring 118 so that no air can enter the outer chambers from the outside.

The LIST OF REFERENCE NUMBERS is as follows:
100 Speed sensor
101 Rotor
102 Permanent magnets
102' Tooth/gap
103 Ring
104 Hall IC
105 Hall element
106 Signal cable
107 Injection molded part
108 End
109 Terminals
110 End
111 Speed sensor housing
112 Radially inner circumferential surface
112' Sensor tip of inner circumferential surface
113 Radially outer circumferential surface
113' Sensor tip of outer circumferential surface
114 Radially outer circumferential surface
115 Speed sensor housing base
116 Outer recesses
116' Air gap between sensor and rotor
117 Central axis
118 Sealing ring
119 Inner recesses
120 Coupling element for magnetic flux
212 Cooling fins for conducting away thermal energy
122 Taper of coupling element for focusing magnetic flux
123 Permanent magnet

The invention claimed is:

1. A speed sensor for measuring a speed of an object moving relative to the speed sensor, comprising:
a rotor;
a speed sensor housing for providing sliding and/or frictional and/or positively locking insertion into a fixed receptacle, wherein the speed sensor housing houses an injection molded part which is made of plastic and into which at least part of a speed sensor element is injected;
wherein the injection molded part has at least one outer recess, on its outer circumferential surface facing an inner face of a wall of the speed sensor housing, wherein an empty outer chamber is formed between each boundary surface of the at least one outer recess and the inner face of the wall of the speed sensor housing,
wherein the speed sensor housing is in the form of a cup, wherein an external diameter of the injection molded part is smaller than an internal diameter of a radially inner circumferential surface of a wall of the speed sensor housing, so that the radially inner circumferential surface of the wall of the speed sensor housing is in contact with a radially outer circumferential surface of the injection molded part,
wherein the empty outer chamber is evacuated, partly evacuated or filled with air under ambient pressure,
wherein the speed sensor housing is in the form of a cup and has a speed sensor housing base at its end pointing toward the rotating object,
wherein a front-side outer recess, in the base surface of which at least part of the speed sensor element is arranged, is formed on an end-side front area, facing the rotating object, of the circumferential surface of the injection molded part,
wherein a front-side empty outer chamber is formed between the base surface of the front-side outer recess and the speed sensor housing base, and
wherein the speed sensor element is thermally insulated with respect to the rotor by the front-side empty outer chamber.

2. The speed sensor of claim 1, wherein at least one inner recess, which forms an empty inner chamber, is formed inside the injection molded part.

3. The speed sensor of claim 2, wherein the at least one empty inner chamber is evacuated, partly evacuated or filled with air under ambient pressure.

4. The speed sensor of claim 1, wherein the speed sensor housing is at least partially configured in the form of a cylindrical sleeve, and the injection molded part is configured at least partially as a cylindrical solid body.

5. The speed sensor of claim 1, wherein the at least one speed sensor element includes an active sensor element or a passive sensor element.

6. The speed sensor of claim 1, wherein the inner recess and/or the outer recess penetrates the injection molded part only partially.

7. The speed sensor of claim 1, wherein the speed sensor housing includes a clamping sleeve.

8. The speed sensor of claim 1, wherein the speed sensor housing is fabricated from a sheet steel.

9. The speed sensor of claim 1, wherein at least one sealing element, which seals the at least one outer chamber with respect to the surroundings, is arranged between the speed sensor housing and the injection molded part.

10. The speed sensor of claim 1, wherein speed sensor is a rotational speed sensor, and the moving object is a rotating object.

11. The speed sensor of claim 10, wherein the rotating object drives the rotor with permanent magnets of the speed sensor which are arranged on a circumference of the rotor so that their poles alternate.

12. The speed sensor of claim 10, wherein the rotating object drives the rotor with teeth and gaps of the speed sensor which are arranged on a circumference of the rotor so that the teeth and the gaps alternate.

13. The speed sensor of claim 10, wherein the speed sensor element includes a Hall element and a semiconductor chip for sensing changes in a magnetic field, or wherein the semiconductor chip is used to detect the change in the magnetic field by a magnet.

14. The speed sensor of claim 1, wherein a coupling element, which is made of ferromagnetic material, extends axially from the speed sensor element into the front-side outer recess of the injection molded part.

15. The speed sensor of claim 14, wherein the coupling element has cooling fins and/or a taper at at least one end to focus the magnetic field.

16. A driver assistance system, comprising:
an anti-slip brake control system (ABS), traction control system (TCS), vehicle movement dynamics control system (ESP), adaptive cruise control system (ACC) and/or an adaptive vehicle control system containing at least one speed sensor;
wherein the at least one speed sensor is for measuring a speed of an object moving relative to the speed sensor, and includes:
a rotor;
a speed sensor housing for providing sliding and/or frictional and/or positively locking insertion into a fixed receptacle, wherein the speed sensor housing houses an injection molded part which is made of plastic and into which at least part of a speed sensor element is injected;
wherein the injection molded part has at least one outer recess, on its outer circumferential surface facing an inner face of a wall of the speed sensor housing, wherein an empty outer chamber is formed between each boundary surface of an outer recess and the inner face of the wall of the speed sensor housing, and/or
wherein the speed sensor housing is in the form of a cup, wherein an external diameter of the injection molded part is smaller than an internal diameter of a radially inner circumferential surface of a wall of the speed sensor housing, so that the radially inner circumferential surface of the wall of the speed sensor housing is in contact with a radially outer circumferential surface of the injection molded part,
wherein the empty outer chamber is evacuated, partly evacuated or filled with air under ambient pressure,
wherein the speed sensor housing is in the form of a cup and has a speed sensor housing base at its end pointing toward the rotating object,
wherein a front-side outer recess, in the base surface of which at least part of the speed sensor element is arranged, is formed on an end-side front area, facing the rotating object, of the circumferential surface of the injection molded part,
wherein a front-side empty outer chamber is formed between the base surface of the front-side outer recess and the speed sensor housing base, and
wherein the speed sensor element is thermally insulated with respect to the rotor by the front-side empty outer chamber.

17. The driver assistance system of claim 16, wherein at least one inner recess, which forms an empty inner chamber, is formed inside the injection molded part.

18. A motor vehicle, comprising:
a driver assistance system, including an anti-slip brake control system (ABS), traction control system (TCS), vehicle movement dynamics control system (ESP), adaptive cruise control system (ACC) and/or an adaptive vehicle control system containing at least one speed sensor;
wherein the at least one speed sensor is for measuring a speed of an object moving relative to the speed sensor, and includes:
a rotor;
a speed sensor housing for providing sliding and/or frictional and/or positively locking insertion into a fixed receptacle, wherein the speed sensor housing houses an injection molded part which is made of plastic and into which at least part of a speed sensor element is injected;
wherein the injection molded part has at least one outer recess, on its outer circumferential surface facing an inner face of a wall of the speed sensor housing, wherein an empty outer chamber is formed between each boundary surface of an outer recess and the inner face of the wall of the speed sensor housing, and/or
wherein at least one inner recess, which forms an empty inner chamber, is formed inside the injection molded part,
wherein the speed sensor housing is in the form of a cup, wherein an external diameter of the injection molded part is smaller than an internal diameter of a radially inner circumferential surface of a wall of the speed sensor housing, so that the radially inner circumferential surface of the wall of the speed sensor housing is in contact with a radially outer circumferential surface of the injection molded part,
wherein the empty outer chamber is evacuated, partly evacuated or filed with air under ambient pressure,
wherein the speed sensor housing is in the form of a cup and has a speed sensor housing base at its end pointing toward the rotating object,
wherein a front-side outer recess, in the base surface of which at least part of the speed sensor element is arranged, is formed on an end-side front area, facing the rotating object, of the circumferential surface of the injection molded part,
wherein a front-side empty outer chamber is formed between the base surface of the front-side outer recess and the speed sensor housing base, and
wherein the speed sensor element is thermally insulated with respect to the rotor by the front-side empty outer chamber.

* * * * *